United States Patent
Yamasaki et al.

(10) Patent No.: US 8,348,520 B2
(45) Date of Patent: Jan. 8, 2013

(54) OPTICAL CONNECTOR STRUCTURE

(75) Inventors: Motohiko Yamasaki, Hyogo (JP); Tadahiko Nakai, Hyogo (JP); Takeshi Satake, Hyogo (JP); Takafumi Hyodo, Hyogo (JP); Haruo Ooizumi, Hyogo (JP); Masahiro Hoshino, Tokyo (JP); Kenji Sato, Tokyo (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 296 days.

(21) Appl. No.: 12/864,677

(22) PCT Filed: Dec. 22, 2008

(86) PCT No.: PCT/JP2008/003899
§ 371 (c)(1), (2), (4) Date: Jul. 27, 2010

(87) PCT Pub. No.: WO2009/095976
PCT Pub. Date: Aug. 6, 2009

(65) Prior Publication Data
US 2010/0310212 A1    Dec. 9, 2010

(30) Foreign Application Priority Data
Jan. 29, 2008   (JP) ................... 2008-017215

(51) Int. Cl.
*G02B 6/38* (2006.01)
(52) U.S. Cl. ..................................... 385/72
(58) Field of Classification Search .......... 385/72
See application file for complete search history.

(56) References Cited

U.S. PATENT DOCUMENTS

| 5,388,171 A * | 2/1995 | Michikoshi et al. ............ 385/36 |
| 2005/0025437 A1 | 2/2005 | Kano et al. |
| 2005/0244101 A1 | 11/2005 | Kitabayashi et al. |
| 2010/0111474 A1 | 5/2010 | Satake et al. |

FOREIGN PATENT DOCUMENTS

| JP | 59-007324 | 1/1984 |
| JP | 1-97303 | 6/1989 |

(Continued)

OTHER PUBLICATIONS

International Search Report for corresponding International Application No. PCT/JP2008/003899 mailed Jan. 27, 2009.

(Continued)

*Primary Examiner* — Ryan Lepisto
*Assistant Examiner* — Jerry Blevins
(74) *Attorney, Agent, or Firm* — Renner, Otto, Boisselle & Sklar, LLP

(57) ABSTRACT

An optical connector structure (C) includes: an optical fiber (100) having a laser beam entrance end to which a quartz chip (120) is integrally connected; a ferrule (200) into which a portion of the optical fiber (100) including the quartz chip (120) is inserted and which holds the portion of the optical fiber; and a receptacle (21) surrounding the ferrule (200), and including a large-diameter hole (21b) formed toward an opening and a small-diameter hole formed toward a back of the receptacle so as to be connected to the large-diameter hole. A front end portion (210) of the ferrule (200) is inserted into the small-diameter hole (21a) of the receptacle (21), and a back body portion (211) of the ferrule (200) is inserted into the large-diameter hole (21b) of the receptacle (21).

2 Claims, 5 Drawing Sheets

FOREIGN PATENT DOCUMENTS

| | | |
|---|---|---|
| JP | 11-248965 | 9/1999 |
| JP | 2005-10309 | 1/2005 |
| JP | 2005-303166 | 10/2005 |
| JP | 2008-103631 | 5/2008 |
| JP | 2008-242012 | 10/2008 |

OTHER PUBLICATIONS

Form PCT/ISA/237 for International Application No. PCT/JP2008/003899 dated Jan. 27, 2009.

* cited by examiner

OPTICAL CONNECTOR STRUCTURE

TECHNICAL FIELD

The present invention relates to optical connector structures for use in, e.g., laser guides.

BACKGROUND ART

Laser guides are laser waveguide devices for transmitting laser beams incident from laser oscillators. Such a laser guide is configured such that an optical fiber coated with a reinforcing fiber layer and a coating layer is inserted through a flexible tube and optical connectors are attached to both ends of the optical fiber.

An optical connector of a laser guide is connected to a laser oscillator such that the end face of a ferrule corresponding to the front end of the optical connector abuts against the positioning face of a receptacle, i.e., a connector for a laser oscillator. In this connection between the laser guide and the laser oscillator, in order to reduce damage caused to the laser guide by, e.g., misalignment therebetween, an optical connector of an air gap structure is fabricated which includes an airspace between the ferrule and the optical fiber (e.g., PATENT DOCUMENT 1).

PATENT DOCUMENT 1: Japanese Patent Publication No. H11-248965

SUMMARY OF THE INVENTION

An optical connector structure according to the present invention includes: an optical fiber having a laser beam entrance end to which a quartz chip is integrally connected; a ferrule into which a portion of the optical fiber including the quartz chip is inserted and which holds the portion of the optical fiber; and a receptacle surrounding the ferrule, and including a large-diameter hole formed toward an opening and a small-diameter hole formed toward a back of the receptacle so as to be connected to the large-diameter hole, where a shoulder is formed between the large-diameter hole and the small-diameter hole. A front end portion of the ferrule is inserted into the small-diameter hole located toward the back of the receptacle, and a back body portion of the ferrule is inserted into the large-diameter hole of the receptacle.

The ferrule may have a shoulder formed such that the front end portion and the back body portion form a small-diameter portion and a large-diameter portion, respectively, of the ferrule, and the shoulder may engage the receptacle such that only the small-diameter portion corresponding to the front end portion is inserted into the small-diameter hole of the receptacle.

The ferrule may include an engagement member engaging the receptacle such that only the front end portion is inserted into the small-diameter hole of the receptacle.

In this case, the engagement member is preferably movable along a length of the ferrule in order to enable adjustment of an extent to which the front end portion of the ferrule is inserted into the small-diameter hole of the receptacle.

The quartz chip connected integrally to the optical fiber may have a greater outside diameter than the fiber.

DESCRIPTION OF EMBODIMENTS

Figure 5:
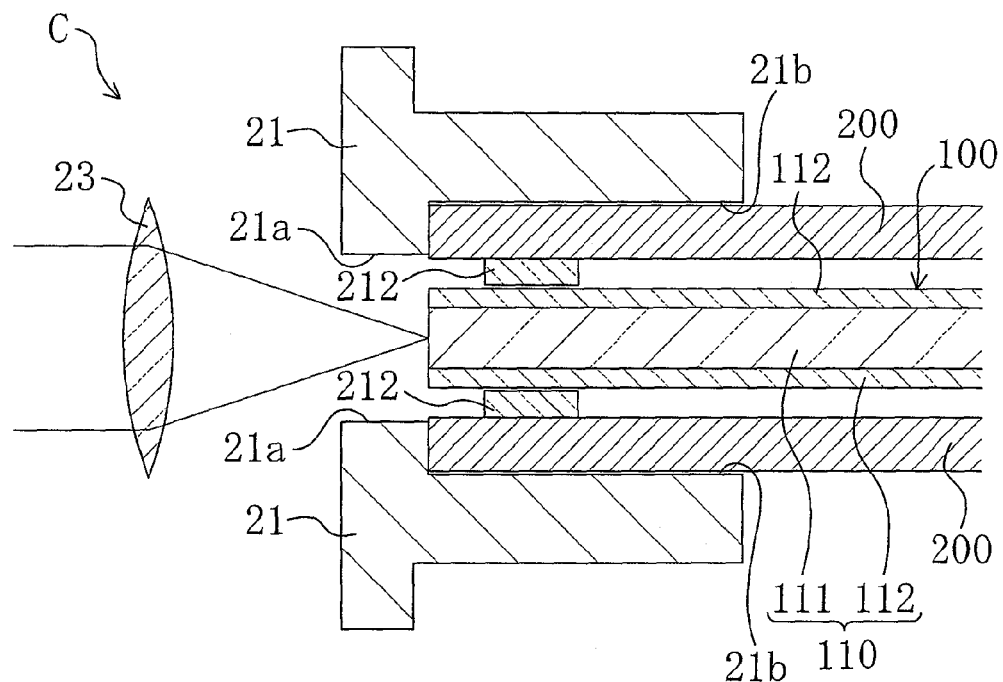
FIG. 5(*a*) is a cross-sectional view illustrating a conventional optical connector structure, and FIG. 5(*b*) is an illustration of a problem of the conventional optical connector.
Figure 5:
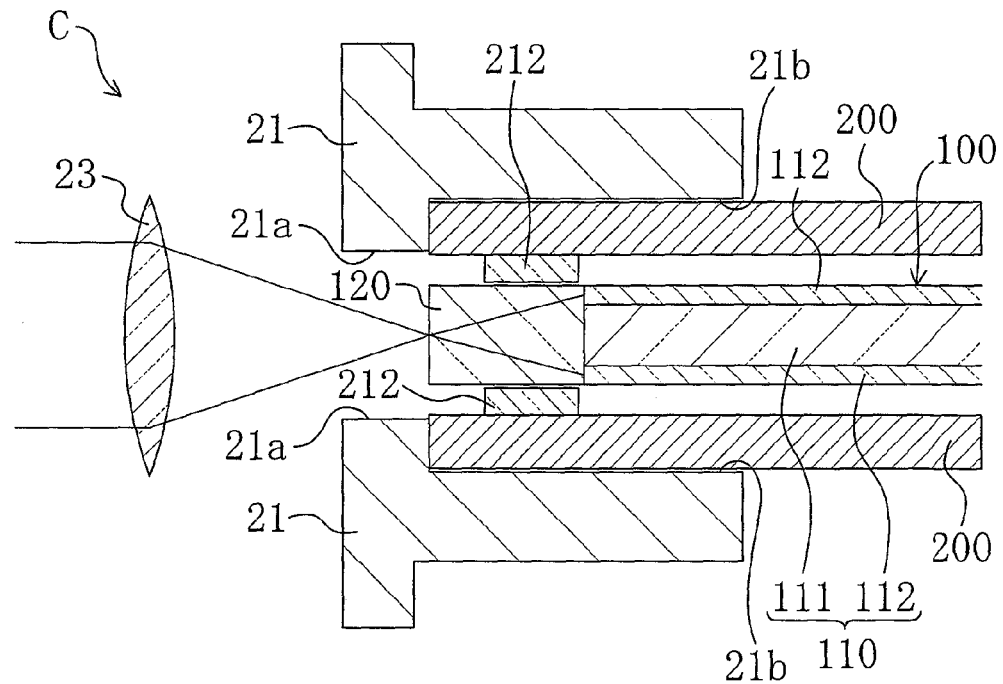

In recent years, while lasers provide higher output power, increasing applications for optical fibers require small core diameters. Therefore, when, as illustrated in FIG. 5(*a*), a laser beam from a laser oscillator directly enters a core 111 of an optical fiber, the optical power density of the laser beam increases. This may cause damage to the corresponding end face of the optical fiber 100.

In order to address the above problem, an optical fiber 100 may be used which includes a quartz chip 120 made of pure quartz glass, and an optical fiber body 110 to the light entrance end of which the quartz chip 120 is integrally connected. The optical fiber 100 may be held by a ferrule 200, and the ferrule 200 may be inserted into a large-diameter hole 21*b* of a receptacle 21. The above configuration can reduce damage caused to the corresponding end face of the optical fiber 100 due to an increase in laser power density. However, as illustrated in FIG. 5(*b*), laser beams are collected on the corresponding end face of the quartz chip 120, and after the collection of the laser beams, the laser beams are again scattered in the quartz chip 120. Therefore, all of incident laser beams cannot enter a core 111 of the optical fiber, thereby causing light to escape. For this reason, when this ferrule 200 is fitted into the receptacle 21, this requires a process for correcting the focal length of a lens inside a laser oscillator after the mounting of an optical connector onto the laser oscillator, and other processes, and thus, requires time for adjustment.

It is an object of the invention to provide an optical connector structure which reduces damage caused to the light entrance end face of an optical fiber by laser beams and allows laser beams to enter the optical fiber without leakage.

According to the present invention, a quartz chip is connected integrally to the light entrance end of an optical fiber. This can reduce damage caused to the light entrance end face of the optical fiber by laser beams. Furthermore, according to the present invention, a front end portion of a ferrule holding the optical fiber is inserted into a small-diameter hole formed in the back of the receptacle, and a back body portion of the ferrule is inserted into a large-diameter hole of the receptacle. This allows laser beams to enter the optical fiber without leakage.

First through third embodiments will be described hereinafter in detail with reference to the drawings.

(First Embodiment)

Figure 1:
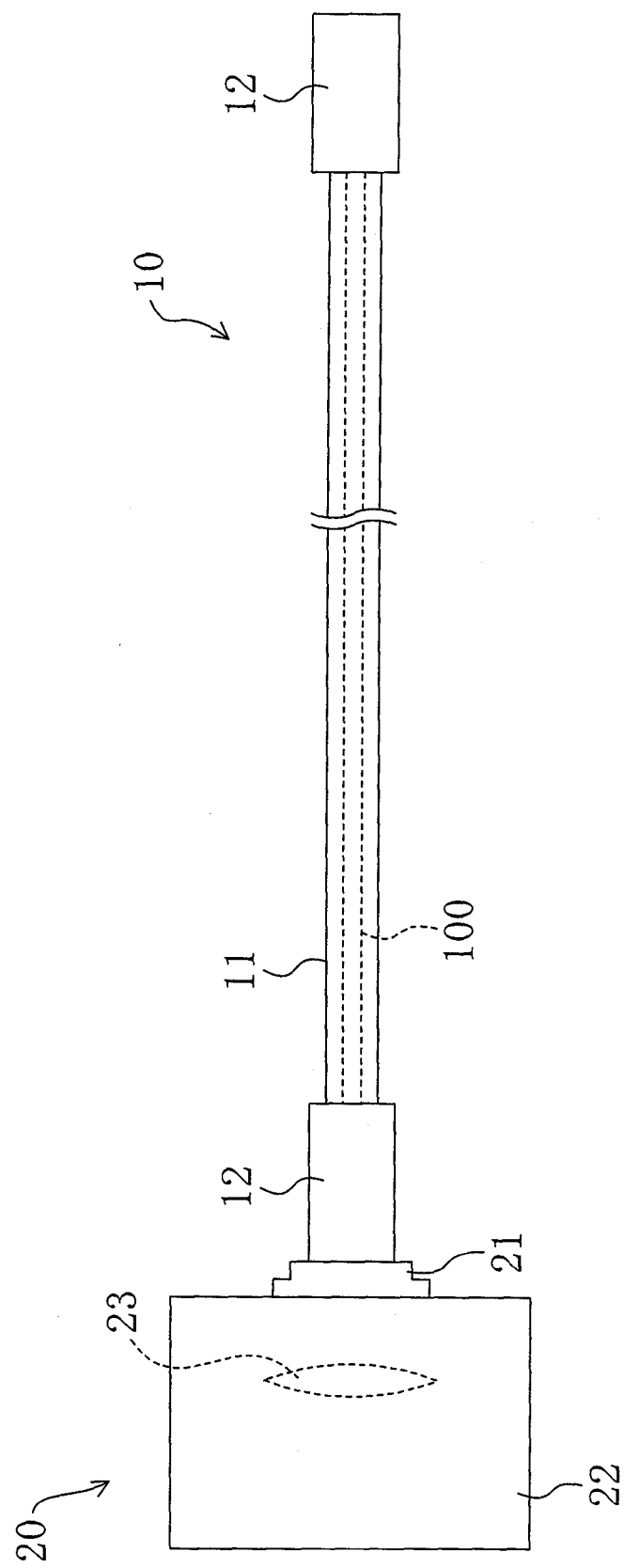
FIG. 1 is a side view schematically illustrating how a laser guide is connected to a laser oscillator.

FIG. 1 illustrates a laser guide 10 according to a first embodiment.

The laser guide 10 is used, as a laser light transmission waveguide for transmitting, e.g., He—Ne laser beams, for laser knives in the medical field and laser beam machines in the machining field.

The laser guide 10 is configured such that, for example, an optical fiber 100 is inserted through a flexible tube 11, such as a SUS flexible tube, and optical connectors 12 are attached to both ends of the optical fiber 100. Then, the laser guide 10 is connected to a laser oscillator 20 while the light entrance end of the optical fiber 100 is inserted into a receptacle 21 placed at the laser beam exit port of the laser oscillator 20.

The optical fiber 100 includes an optical fiber body 110, and a quartz chip 120 connected integrally to the light entrance end of the optical fiber body 110.

The optical fiber body 110 is made of quartz glass, and includes a centrally located core 111, and a cladding 112 surrounding the core 111. The optical fiber body 110 has, for example, a length of 50 mm through 1 km, a diameter of 50-3000 µm, and a core diameter of 10-2500 µm. For example, the optical fiber body 110 preferably has a diameter of 750 µm and a core diameter of 600 µm.

The optical fiber body 110 may be an SI optical fiber including the core 111 made of pure quartz glass and the cladding 112 made of quartz glass doped with, e.g., fluorine (F). Alternatively, the optical fiber body 110 may be a GI fiber including the core 111 made of quartz glass doped with, e.g., germanium (Ge) and the cladding 112 made of pure quartz glass.

The quartz chip 120 is made of, e.g., pure quartz glass. The quartz chip 120 has the shape of a solid cylinder having, e.g., a diameter of 750 µm and a thickness of 2.7 mm. The light entrance end face of the quartz chip 120 is preferably smoothly formed by being subjected to surface melting treatment.

The thickness of the quartz chip 120 is determined with the numerical aperture (NA) of the optical fiber body 110 and other factors taken into consideration so that all received laser beams can be collected and enter the core 111 of the optical fiber body 110. Specifically, the quartz chip 120 is designed so that the optical length from the light entrance end face of the quartz chip 120 to the positioning face of the receptacle 21 which will be described below is equal to the optical length from the light entrance end face of the quartz chip 120 to the interface between the quartz chip 120 and the optical fiber body 110 (i.e., the optical length corresponding to the thickness of the quartz chip 120).

The optical fiber 100 is formed by melting and integrating the optical fiber body 110 and the quartz chip 120. Specifically, the light entrance end face of the optical fiber body 110 and the face of the quartz chip 120 which is fusion-spliced to the optical fiber body are brought in contact with each other, and the contact area is heated and melted by, e.g., a burner, thereby forming the optical fiber 100. Furthermore, the flame of, e.g., a burner, or a $CO_2$ laser beam or the like is applied to the light entrance end face of the quartz chip 120, thereby subjecting the light entrance end face to surface melting treatment in order to smooth the light entrance end face. The light entrance end face may be polished before this surface melting treatment.

A front end portion of each of the optical connectors 12 includes a ferrule 200.

The ferrule 200 is generally tubular. A front end portion 210 of the ferrule 200 forms a small-diameter portion, and a back body portion 211 thereof forms a large-diameter portion. A shoulder is formed to separate the large-diameter portion from the inner diameter portion. This shoulder is used to engage the positioning face of the receptacle 21 so that while only the front end portion 210 forming the small-diameter portion is inserted into a small-diameter hole 21a of the receptacle 21, the back body portion 211 forming the large-diameter portion is inserted into a large-diameter hole 21b of the receptacle 21. The front end portion 210 of the ferrule 200 has, e.g., a length of 1.9 mm, an outside diameter of 2.8 mm, and an inside diameter of 2 mm. The back body portion 211 of the ferrule 200 has, e.g., a length of 10 mm, an outside diameter of 4 mm, and an inside diameter of 2 mm. The shoulder between the small-diameter portion 210 and the large-diameter portion 211 has, e.g., a height of 0.6 mm.

The ferrule 200 is made of, e.g., a metal, such as copper, brass, aluminum, phosphor bronze, or stainless steel, or such a metal plated with nickel.

A tubular fiber centering member 212 is placed on the inner face of the ferrule 200 so as to be located, e.g., 1.5 mm away from the front end of the ferrule 200. The fiber centering member 212 is made of, e.g., a sapphire chip, and serves to hold the optical fiber 100 so that the optical fiber 100 is disposed centrally in the ferrule 200. The fiber centering member 212 has, e.g., an outside diameter of 3 mm, an inside diameter of 770 µm, and a length of 4 mm.

The laser guide 10 is configured in the following manner: the optical fiber body 110 of the optical fiber 100 is coated with a reinforcing fiber layer (such as aramid fibers) and a coating layer (such as nylon, vinyl chloride, or fluoropolymers) so as to be used as a coated optical fiber; the coated optical fiber is inserted through the flexible tube 11; and the ferrules 200 of the optical connectors 12 are fitted onto both end parts of the coated optical fiber. The laser guide 10 is fixed such that while the ferrules 200 hold the optical fiber body 110 by using, e.g., an adhesive (such as an epoxy resin), or a caulked structure, the fiber centering member 212 holds the front end portion of the optical fiber 100, thereby inserting the optical fiber 100 into the center of the ferrule 200. Meanwhile, an airspace is formed between the ferrule 200 and a portion of the optical fiber 100 located forward of the fiber centering member 212, thereby obtaining an air gap structure.

The laser oscillator 20 includes a laser light source (not shown) inside a laser oscillator main unit 22, and an optical device 23, such as a lens. The receptacle 21 is attached integrally to the face of the laser oscillator main unit 22 including the laser beam exit port, e.g., with screws. The receptacle 21 serves as a connector for connecting, e.g., a laser guide to the laser oscillator 20.

The receptacle 21 has the large-diameter hole 21b formed toward an opening of the receptacle 21, and the small-diameter hole 21a formed toward the back of the receptacle 21 so as to be connected to the large-diameter hole 21b. The small-diameter hole 21a of the receptacle 21 has, e.g., an inside diameter of 3 mm and a length of 1 mm along the fiber. The large-diameter hole 21b of the receptacle 21 has, e.g., an inside diameter of 4 mm and a length of 9.9 mm along the fiber. The height of a shoulder defined between the small-diameter hole 21a and the large-diameter hole 21b is 0.5 mm, and this shoulder forms the positioning face of the receptacle 21.

The receptacle 21 made of, e.g., a metal, such as copper, brass, aluminum, phosphor bronze, or stainless steel, or such a metal plated with nickel. The outer shape of the receptacle 21 is, for example, circular or rectangular.

Figure 2:
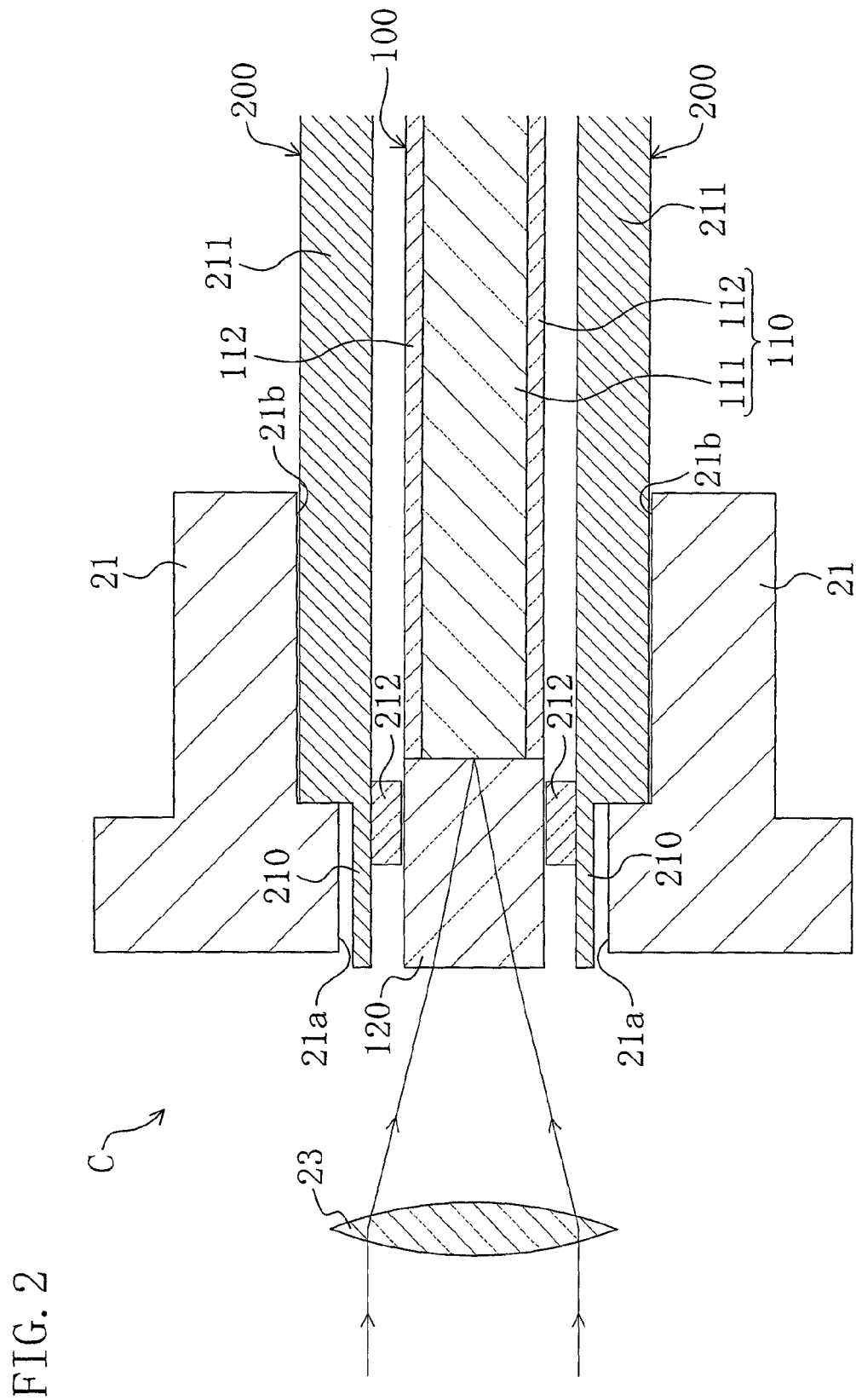
FIG. 2 is a cross-sectional view illustrating an optical connector structure according to a first embodiment.

FIG. 2 illustrates a cross section of such an optical connector structure C.

The optical connector structure C is formed by inserting a ferrule 200 of a laser guide 10 into a receptacle 21. In this case, a shoulder separating a small-diameter portion 210 of the ferrule 200 from a large-diameter portion 211 thereof is engaged with the positioning face of the receptacle 21, i.e., a shoulder defined between a small-diameter hole 21a and a large-diameter hole 21b. Thus, only the front end portion 210 of the ferrule 200 is inserted into the small-diameter hole 21a of the receptacle 21, and the back body portion 211 is inserted into the large-diameter hole 21b of the receptacle 21. Since the diameter of the large-diameter hole 21b of the receptacle 21 is substantially equal to the outside diameter of the large-diameter portion 211 of the ferrule 200, the ferrule 200 is fixed with the large-diameter portion 211 of the ferrule 200 fitted into the large-diameter hole 21b of the receptacle 21.

In the laser guide 10 and the laser oscillator 20 which form the optical connector structure C, laser beams emitted from a laser light source are refracted with the optical device 23 to enter the light entrance end face of the quartz chip 120 of the laser guide 10, are transmitted through the core 111 of the optical fiber body 110 while being amplified, and exit from the light exit end of the optical fiber body 110. In this manner, an object to be processed (not shown) is subjected to a predetermined process.

With the above configuration, the quartz chip 120 is connected integrally to the light entrance end of the optical fiber 100. This can reduce damage caused to the light entrance end face of the optical fiber by laser beams.

Furthermore, with the above configuration, only the front end portion of the ferrule 200, i.e., the small-diameter portion 210, is inserted into the small-diameter hole 21a located toward the back of the receptacle 21, and the back body portion 211 is inserted into the large-diameter hole 21b of the receptacle, thereby allowing laser beams entering the optical fiber 100 to be collected at the interface between the quartz chip 120 and the optical fiber body 110. This allows laser beams to enter the optical fiber body 110 without leakage, and to propagate.

(Second Embodiment)

Similar to the first embodiment, a laser guide 10 according to a second embodiment is configured such that, for example, an optical fiber 100 is inserted through a flexible tube 11, such as a SUS flexible tube, and optical connectors 12 are attached to both ends of the optical fiber 100. The laser guide 10 is used as a laser light transmission waveguide for transmitting, e.g., Ho—YAG laser beams.

The optical fiber 100 includes an optical fiber body 110, and a quartz chip 120 connected integrally to the light entrance end of the optical fiber body 110.

The optical fiber body 110 has the same structure as in the first embodiment, and has, e.g., a diameter of 300 µm and a core diameter of 220 µm.

The quartz chip 120 has the shape of a solid cylinder having, e.g., a diameter of 500 µm and a thickness of 800 µm.

A front end portion of each of the optical connectors 12 includes a ferrule 200. The ferrule 200 is generally tubular. A front end portion 210 of the ferrule forms a small-diameter portion, and a back body portion 211 thereof forms a large-diameter portion. A shoulder is formed to separate the small-diameter portion from the large-diameter portion. Furthermore, the inner face of the small-diameter portion 210 of the ferrule 200 is provided with a shoulder. A portion of the small-diameter portion 210 extending from the shoulder toward the front end thereof is thinner. The front end portion 210 of the ferrule 200 has, e.g., an outside diameter of 1.5 mm, the thinner portion of the front end portion 210 located toward the front end thereof has, e.g., an inside diameter of 1 mm and a length of 0.5 mm, and furthermore a portion of the front end portion 210 extending from the shoulder toward the back end thereof has, e.g., an inside diameter of 0.51 mm. The back body portion 211 of the ferrule 200 has, e.g., an outside diameter of 3.17 mm, an inside diameter of 0.51 mm, and a length of 9.8 mm.

In the laser guide 10 including the optical fiber 100 and the ferrule 200, the inner face of the front end portion 210 of the ferrule 200 is provided with the shoulder so that a portion of the front end portion 210 located toward the front end of the ferrule 200 is thinner. This provides an air gap structure in which an airspace is formed in a front end portion of the laser guide 10 between the optical fiber 100 and the ferrule 200.

A receptacle 21 attached to a laser oscillator main unit 22 has the same structure as in the first embodiment. The receptacle 21 includes, e.g., a small-diameter hole 21a having an inside diameter of 1.6 mm and a length of 1 mm along the fiber, and a large-diameter hole 21b having an inside diameter of 3.17 mm and a length of 9.8 mm along the fiber. The height of a shoulder defined between the small-diameter hole 21a and the large-diameter hole 21b is, for example, 0.785 mm.

Figure 3:
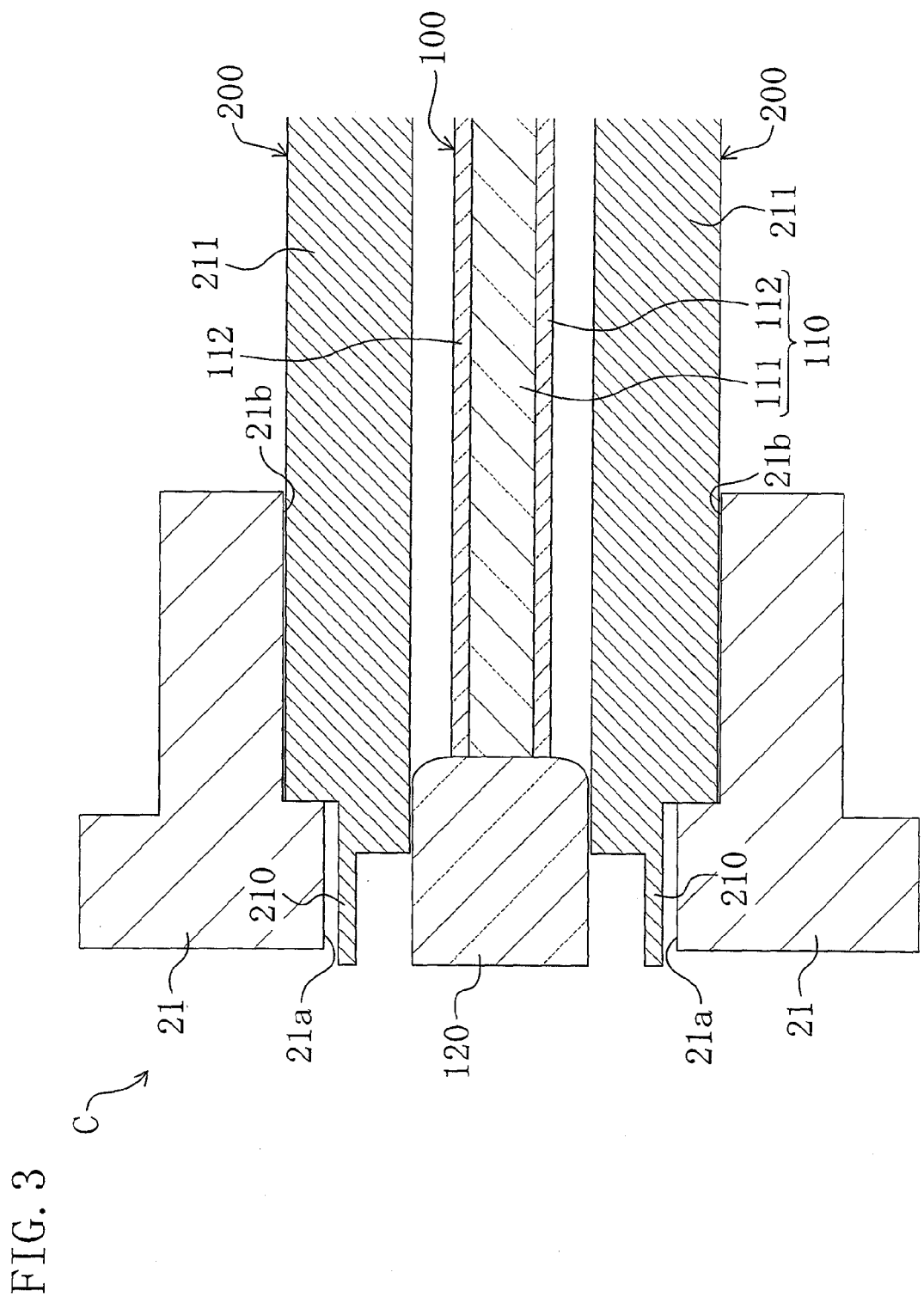
FIG. 3 is a cross-sectional view illustrating an optical connector structure according to a second embodiment.

FIG. 3 illustrates an optical connector structure C according to the second embodiment.

The optical connector structure C is formed in a similar manner to that in the first embodiment.

With the above configuration, even when the laser guide 10 is formed by connecting the quartz chip 120 having a greater outside diameter than the diameter of the optical fiber body 110 integrally to the optical fiber body 110, the optical power density of a laser beam increases. This can reduce damage caused to the light entrance end face of the optical fiber.

The other structures and advantages are identical with those of the first embodiment.

(Third Embodiment)

Similar to the first embodiment, a laser guide 10 according to a third embodiment is configured such that, for example, an optical fiber 100 is inserted through a flexible tube 11, such as a SUS flexible tube, and optical connectors 12 are attached to both ends of the optical fiber 100. The laser guide 10 is used as a laser light transmission waveguide for transmitting, e.g., fiber laser light.

The optical fiber 100 includes an optical fiber body 110, and a quartz chip 120 connected integrally to the light entrance end of the optical fiber body 110. The optical fiber body 110 has the same structure as in the first embodiment, and has, e.g., a diameter of 750 µm and a core diameter of 600 µm.

The quartz chip 120 has, e.g., a tapered cone shape. The face of the quartz chip 120 connected to the optical fiber body 110 has, e.g., a diameter of 1.2 mm; the face thereof located toward the front end of the optical fiber has, e.g., a diameter of 7 mm; and the quartz chip 120 has a thickness of 13 mm.

A front end portion of each of the optical connectors 12 includes a ferrule 200.

The ferrule 200 includes a generally tubular ferrule body 220, and a ring-shaped engagement member 221 provided on the outer circumferential face of the ferrule body 220. The engagement member 221 is preferably movable along the length of the ferrule 200 so that the extent to which a front end portion of the ferrule 200 is inserted into a small-diameter hole 21a of a receptacle 21 is adjusted, for example, using a screw structure. The ferrule body 220 has, e.g., an outside diameter of 15 mm, an inside diameter of 7 mm, and a length of 100 mm. A portion of the ferrule body 220 within 20 mm from the front end thereof includes a thread groove corresponding to an M10 screw, e.g., in order to fit the engagement member 221 onto the outer circumferential face of the ferrule body 220.

The engagement member 221 has, e.g., an outside diameter of 13 mm, an inside thread diameter of M10, and a length of 8 mm.

A receptacle 21 attached to a laser oscillator main unit 22 has the same structure as in the first embodiment. The receptacle 21 includes, e.g., a small-diameter hole 21a having an inside diameter of 11 mm and a length of 8 mm along the fiber, and a large-diameter hole 21b having an inside diameter of 15 mm and a length of 90 mm along the fiber. The height of a shoulder defined between the small-diameter hole 21a and the large-diameter hole 21b is, for example, 2 mm.

Figure 4:
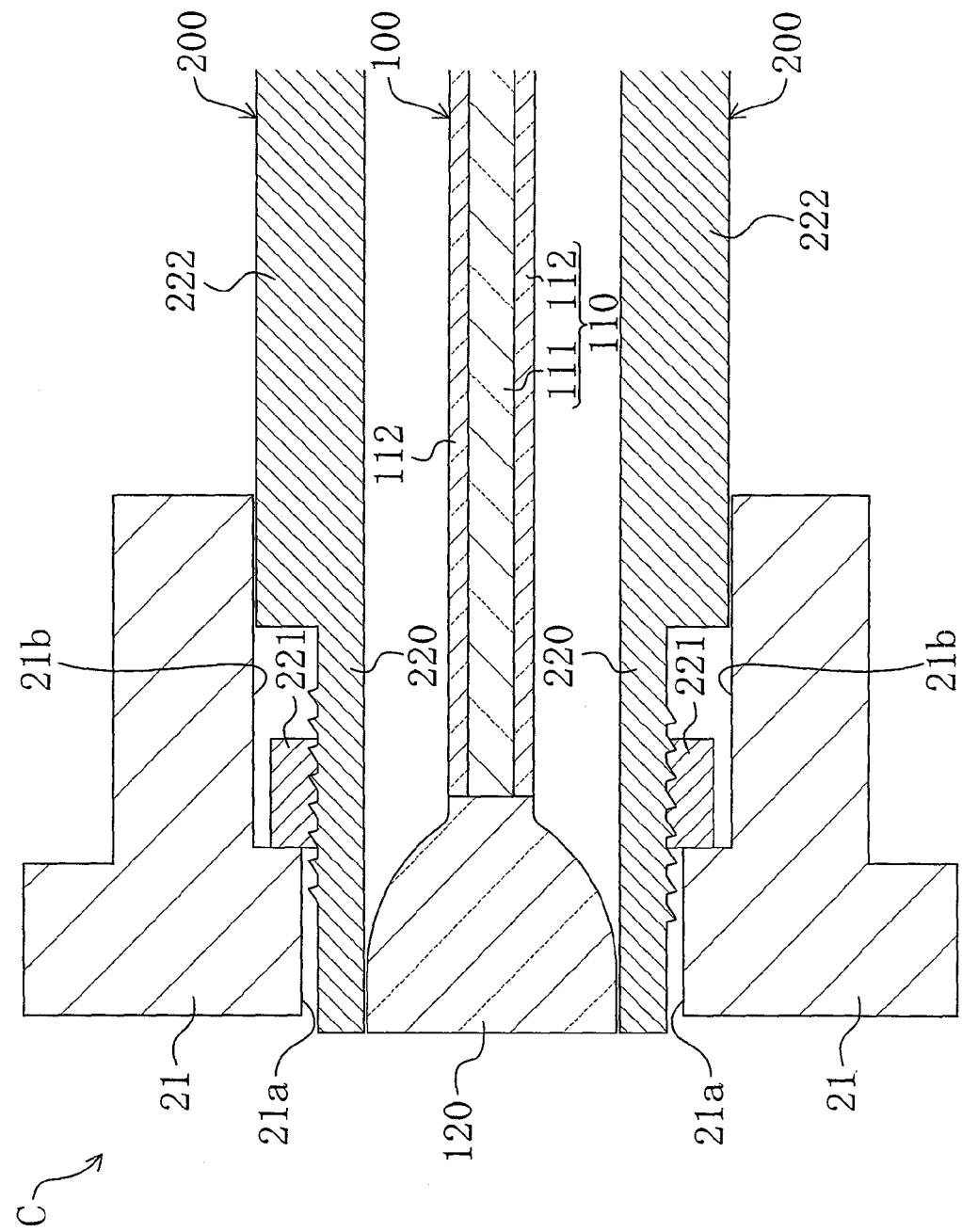
FIG. 4 is a cross-sectional view illustrating an optical connector structure according to a third embodiment.

FIG. 4 illustrates an optical connector structure C according to the third embodiment.

The optical connector structure C is formed in the following manner. Specifically, the front end face of an engagement member 221 of a ferrule 200 of a laser guide 10 is engaged with the positioning face of a receptacle 21, and while only a front end portion of the ferrule 200 is inserted into a small-diameter hole 21a of the receptacle 21, a portion of the ferrule 200 extending from the front end face of the engagement member 221 toward the back end of the ferrule 200 is inserted into a large-diameter hole 21b of the receptacle 21.

With the above configuration, the engagement member 221 is movable along the length of the ferrule 200. Thus, after the optical fiber 100 is held by the ferrule 200, the location at which the ferrule 200 engages the receptacle 21 can be adjusted so that laser beams enter the interface between the quartz chip 120 and the front end face of the optical fiber body 110.

The other structures and advantages are identical with those of the first and second embodiments.

(Other Embodiments)

In the first through third embodiments, the optical fiber body 110 of the optical fiber 100 is a quartz-clad fiber. However, the optical fiber body 110 is not limited to the quartz-clad fiber. The optical fiber body 110 may be a polymer-clad fiber, a double-clad fiber, or any other optical fiber. However, when the optical fiber body 110 is a polymer-clad fiber, a quartz chip is fusion-spliced to the optical fiber body 110 from which a resin cladding is removed.

In the first through third embodiments, the quartz chip 120 connected integrally to the optical fiber 100 is entirely made of pure quartz. However, the quartz chip 120 is not limited to pure quartz. The quartz chip 120 may form, e.g., an SI optical fiber having an optical waveguide portion corresponding to the fiber core.

In the first through third embodiments, the front end portion of the optical fiber 100 is flush with the corresponding end face of the ferrule 200. However, the laser guide 10 may be configured such that the ferrule 200 protrudes beyond the optical fiber 100. Furthermore, the corresponding end face of the ferrule 200 may be flush with the end face of the receptacle 21 located toward the small-diameter hole 21a (the face of the receptacle 21 attached to the laser oscillator main unit 22). Alternatively, the ferrule 200 may protrude beyond the receptacle 21. Alternatively, the front end portion of the ferrule 200 does not need to reach the end face of the receptacle 21 located toward the small-diameter hole 21a.

INDUSTRIAL APPLICABILITY

The present invention is useful for an optical connector structure.

The invention claimed is:

1. An optical connector structure comprising:
    an optical fiber having a laser beam entrance end to which a quartz chip is integrally connected;
    a ferrule into which a portion of the optical fiber including the quartz chip is inserted and which holds the portion of the optical fiber; and
    a receptacle surrounding the ferrule, and including a large-diameter hole formed toward an opening and a small-diameter hole formed toward a back of the receptacle so as to be connected to the large-diameter hole, where a shoulder is formed between the large-diameter hole and the small-diameter hole,
    wherein a front end portion of the ferrule is inserted into the small-diameter hole located toward the back of the receptacle, and a back body portion of the ferrule is inserted into the large-diameter hole of the receptacle, and wherein the ferrule includes an engagement member engaging the receptacle such that only the front end portion is inserted into the small-diameter hole of the receptacle, the engagement member being movable along a length of the ferrule in order to enable adjustment of an extent to which the front end portion of the ferrule is inserted into the small-diameter hole of the receptacle.

2. The optical connector structure of claim 1, wherein the quartz chip has a greater outside diameter than the fiber.

* * * * *